Dec. 17, 1968    P. GROSPAS    3,416,615
APPARATUS FOR BORING BY CABLE-CONTROLLLED PERCUSSION
Filed March 21, 1966    4 Sheets-Sheet 1
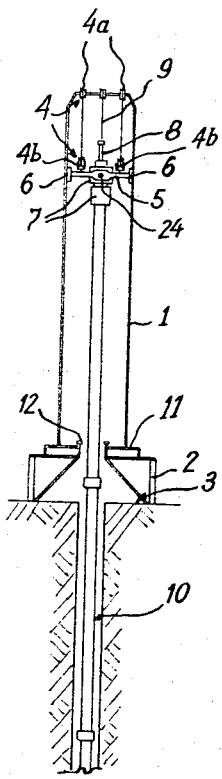
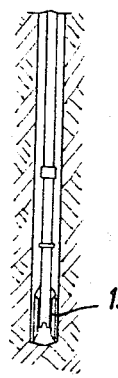
Fig. 1
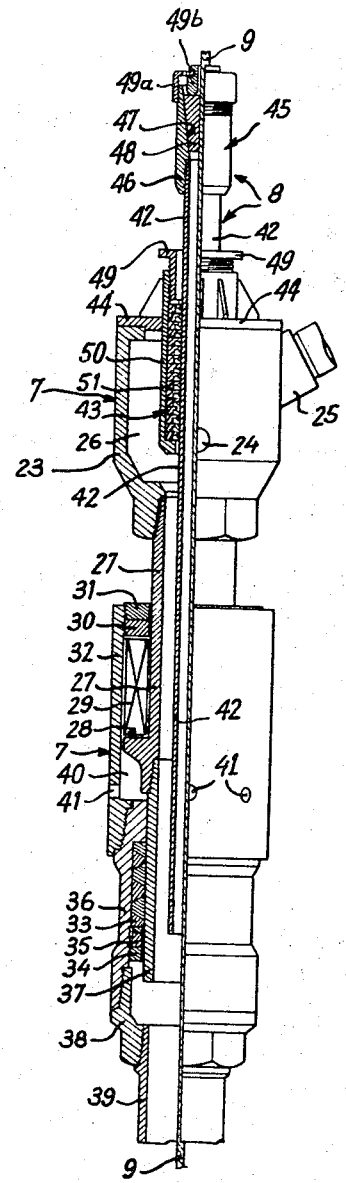
Fig. 2
INVENTOR
PIERRE GROSPAS
BY
Bacon & Thomas
ATTORNEYS Dec. 17, 1968    P. GROSPAS    3,416,615
APPARATUS FOR BORING BY CABLE-CONTROLLLED PERCUSSION
Filed March 21, 1966    4 Sheets-Sheet 2

INVENTOR
PIERRE GROSPAS
BY
Bacon & Thomas
ATTORNEYS

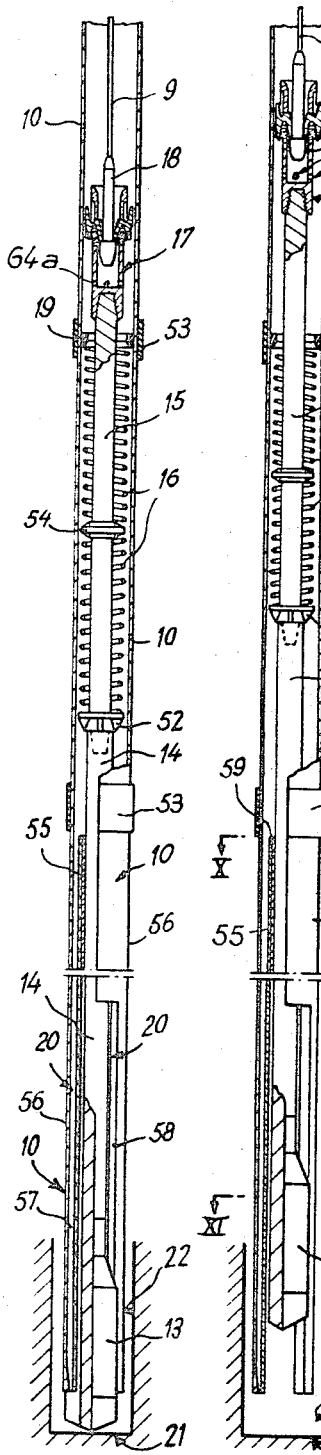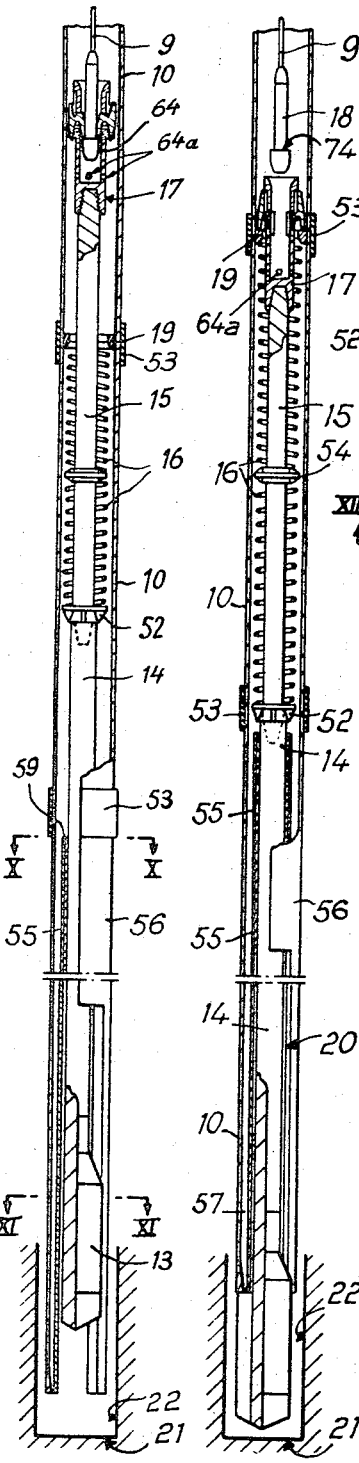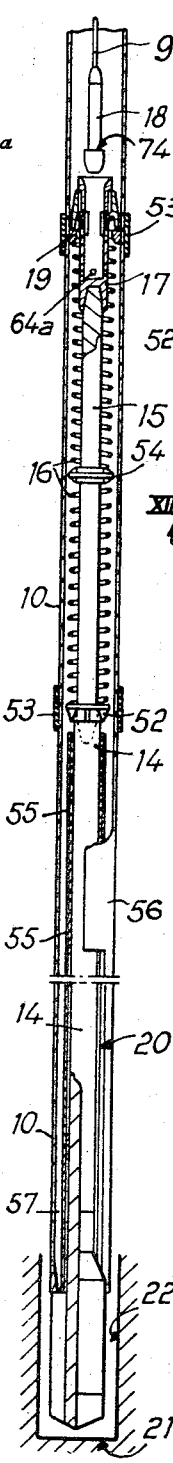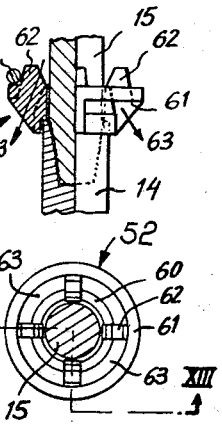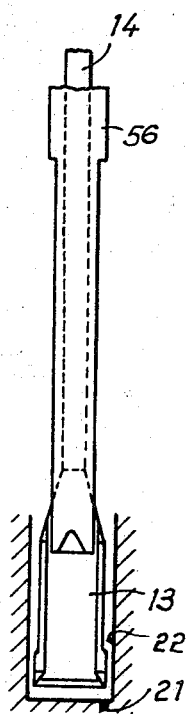

United States Patent Office 3,416,615
Patented Dec. 17, 1968

3,416,615
APPARATUS FOR BORING BY CABLE-
CONTROLLED PERCUSSION
Pierre Grospas, Le Continental, Place des Moulins,
Monte Carlo, Monaco
Filed Mar. 21, 1966, Ser. No. 536,084
Claims priority, application France, Mar. 22, 1965,
10,191
21 Claims. (Cl. 175—173)

ABSTRACT OF THE DISCLOSURE

A cable-controlled percussion drilling apparatus comprising a derrick supporting a cable and a trepan provided with a master rod connected to the cable, a beater motor for moving the cable, a circulation column provided at its lower end with a guide member for the trepan and/or the master rod and at its upper end with an injection head suspended on a yoke guided by the derrick and controlled by a pulley block mounted on the derrick. An axially movable, sealed input screen for the cable held in the injection head surrounding the cable in a sealed manner. Means for communicating the circulation column with a space situated in front of a cutting edge of the trepan when the trepan is located in a hole to be bored and a suspension head integral with the trepan and intended to hook the trepan and its master rod alternately to either the lower tip of the cable or to the circulation column.

---

The present invention relates to an apparatus for boring by cable-controlled percussion.

Up to the present time, such boring apparatus were not suitable for a continuous circulation of cleaning fluid during the actual boring operation. In the case of conventional apparatus, the excavated materials produced by the trepan on the cutting edge in a bore hole must be brought up intermittently by means of a scoop for example. Very often, after a certain advance movement of the trepan, the latter no longer serves to attack the virgin rock but only operates uselessly in the excavated materials.

The present invention minimizes the above mentioned disadvantages and has for its particular object the production of an apparatus for drilling by cable-controlled percussion and permitting a continuous circulation of a cleaning fluid, as well as the simple maneuvering of the boring movement without the presence of the cable being a hindrance.

To this end, the apparatus for boring by cable-controlled percussion comprises: a derrick, a beater motor for maneuvering the cable and a trepan provided with a master rod connected to the cable, and is characterized in that it comprises a circulation column provided at its lower end with a member for guiding the trepan and/or the master rod and at its upper end with an injection head suspended from a yoke guided by the derrick and maneuvered by a pulley block mounted on said derrick; a sealed input screen for the cable in the injection head, said screen being axially mobile with respect to the injection head and capable of surrounding in a sealed manner said cable; means for connecting the circulation column with the space situated in front of the cutting edge of the bore hole; and a suspension head integral with the trepan and intended to hook the trepan and its master rod alternately to the lower tip of the cable or to the circulation column.

With the boring apparatus according to the invention, it is possible to continuously evacuate the excavated materials produced by the trepan whilst benefiting from the known advantages of the process of boring with cable controlled percussion.

Figure 15:
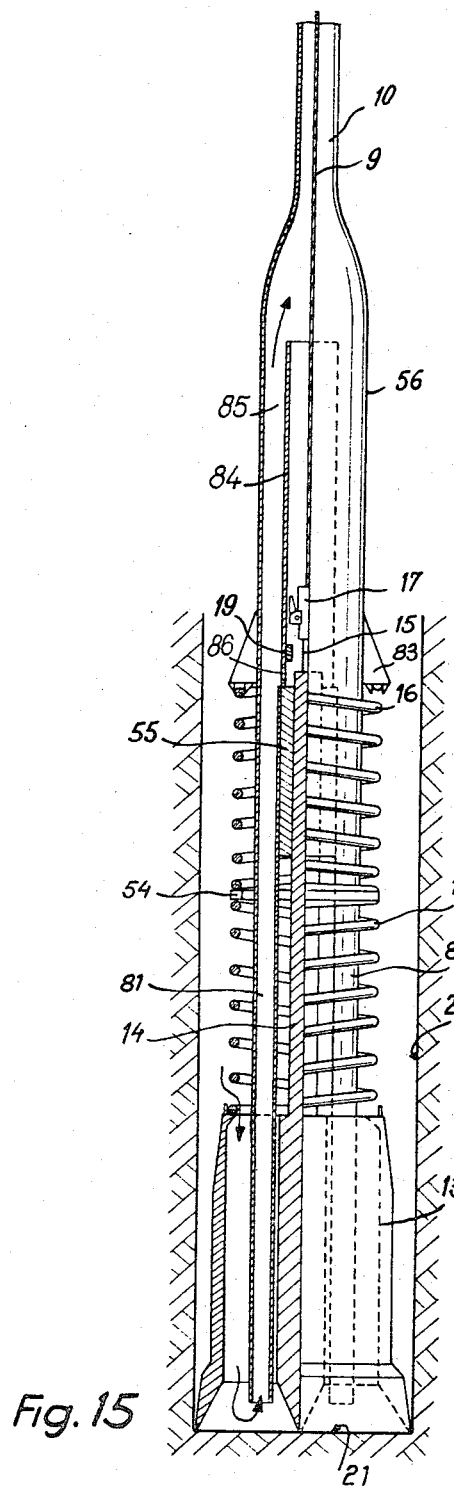
Figures 3, 5:
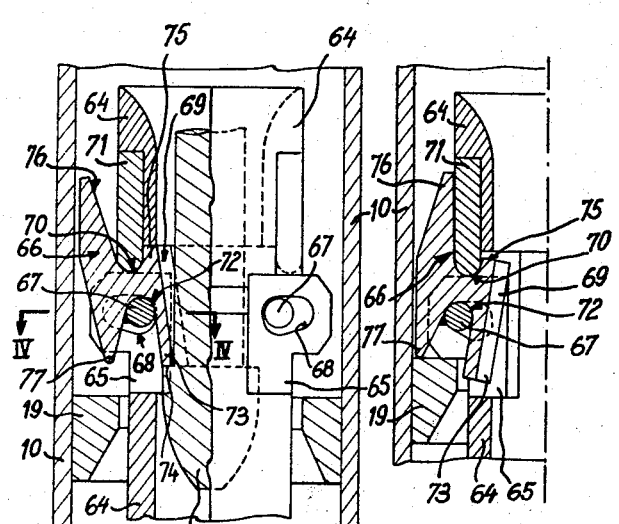
Figure 4:
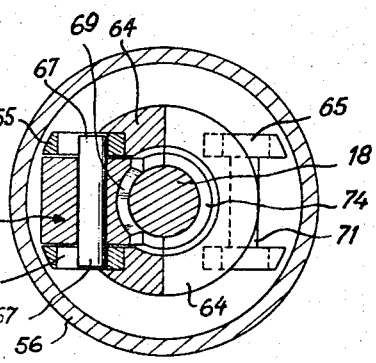
Figure 10:
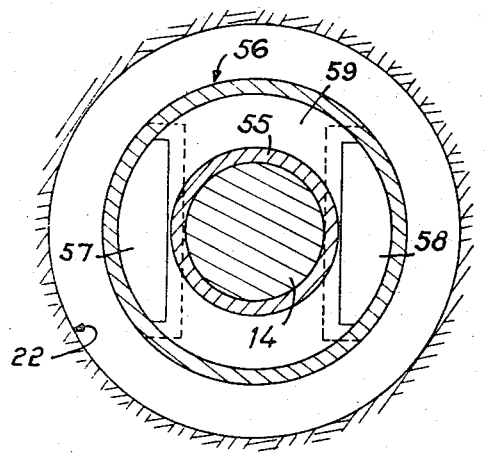
Figure 11:
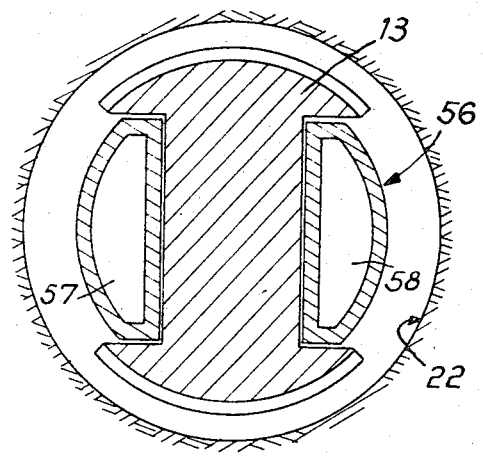
Figure 14:
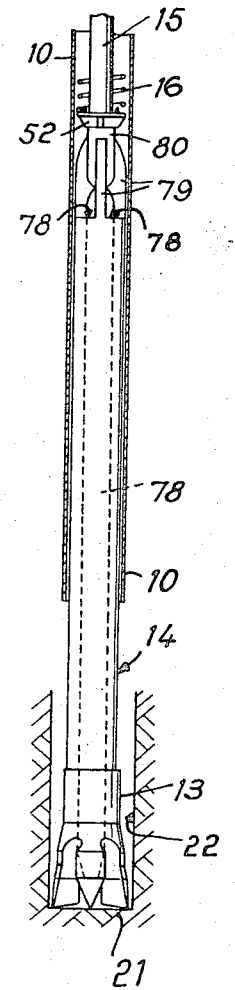

Other characteristics and advantages of the present invention will appear from the description of several embodiments, reference being made to the accompanying drawings in which:

FIGURE 1 is a schematic view, of the apparatus according to the invention,

FIGURE 2 is a view, partly in section, of the injection head provided with an input screen, FIGURE 3 is an axial section through the suspension head of the trepan in such a position that the lower tip of the cable is rendered integral with the trepan, FIGURE 4 is a plan view in transverse section of the suspension head along the IV—IV of FIGURE 3, FIGURE 5 is a part axial section through the suspension head of the trepan in such a position that the trepan is hooked to the circulation column, FIGURE 6 is a part axial section through the lower part of the circulation column, of the trepan and of certain other members, the trepan being shown in the operating position at the bottom of the bored hole, FIGURE 7 is a view similar to that of FIGURE 6, the trepan being shown at the extreme upper point of its ascending path, FIGURE 8 is a view similar to those shown in FIGURES 6 and 7, the trepan being released from the lower tip of the cable and hooked on the circulation column, FIGURE 9 is a side view of the trepan and of the lower part of the circulation column, FIGURE 10 is a transverse section along the line X—X of FIGURE 7, FIGURE 11 is a transverse section along the line XI—XI of FIGURE 7, FIGURE 12 is a plan view of the lower base of the additional-thrust spring, FIGURE 13 is a lateral view, partly in axial section, along the line XIII—XIII of FIGURE 12, FIGURE 14 is a side view, partly in section, of a second embodiment of the means permitting the internal volume of the circulation column to be placed in communication with the space situated above the bottom of the hole, and FIGURE 15 is a side view, partly in section, of a third embodiment of the lower end of the column and means for communicating the circulation column with the bottom of the bore hole.

Referring to the drawings, in FIGURE 1, a derrick rests by means of a sub-structure 2 on the ground 3. A pulley block 4 having two fixed pulleys 4a and two mobile pulleys 4b serves to support a yoke 5 guided vertically in the derrick 1 by means of grooves 6. On this yoke 5 is mounted an injection head 7 provided with a sealed input screen 8 for the better cable 9 in said injection head 7. At the lower end of the injection head 7 is screwed the upper element of the circulation column 10. On the platform 11 of the derrick, there may advantageously be provided a rotary table 12 permitting the circulation column to be driven in a slow rotary movement with a small torque. In this case, the upper element of the circulation column is replaced by a square rod. The pulleys 4a, 4b of the pulley block 4 are arranged in such a manner on the derrick 1 and the yoke 5, that the beater cable 9 can pass freely through the axis of the circulation column 10.

A beater trepan, or boring bit 13, is guided axially in the circulation column 10 and is integral with a master rod 14, and if necessary, with an intermediate rod 15, and includes an assembly of additional thrust springs 16 and a suspension head 17 intended to hook the trepan 13 alternately on a lower tip 18 of the cable 9 or on the lower part of the circulation column 10 by means of an annular stop 19 perforated at certain points and integral with the latter. On the lower part of the assembly comprising the circulation column 10 trepan 13 and master rod 14, means 20 are provided for communicating the internal space of this column 10 with the space situated above the bottom 21 of the bore hole 22, whilst guiding in a sealed manner the master rod 14 to the inside of the lower part of the circulation column 10.

Thus, the use of a cable 9 inside the column 10, this cable intended for maneuvering a trepan 13 not being a hindrance, because the cable 9 can be rapidly disengaged from the trepan 13 and it can be refixed rapidly on the latter as soon as the operations for maneuvering the column 10 are terminated, these operations consisting in mounting and dismounting the tubes of the circulation column according to conventional methods.

Because the trepan 13 is guided laterally in the circulation column 10, a slow rotational movement with a small torque may, if necessary, be effected.

The maneuver of the trepan 13 by cable 9 combined with a circulation of the mud injected under pressure at the top of the circulation column 10 (direct circulation) necessitates a perfect seal between the upper end of the circulation column 10 and the cable 9 during the movements of the latter during beating. As may be seen in FIGURE 2, to this end and according to the invention, an injection head 7 is proposed, connected at its lower part with the circulation column so as to permit the latter to rotate, this head comprising at its lower part the sealed input screen 8 which is axially movable with respect to the head 7.

The injection head 7 comprises a distribution box 23 supported by the yoke 5 by means of two lateral shafts 24. A channel 25 for the input of mud, connected by a flexible lead to a delivery pump, (these two not being shown in the drawing) opens out tangentially into the chamber 26 of said box 23. A tube 27 fixed to the lower part of this box 23 comprises an external shoulder 28 serving as a support for a bearing 29 on which rests, by means of two threaded adjusting discs 30, 31, a rotary cylindrical body 32. A packing gland 33 held by adjusting nuts 34, 35, in an annular cavity of a connecting tube 36 surrounds in a sealed manner a wearing tube 37 integral with the tube 27. The connecting tube 36 is fixed on the one hand to the rotary cylindrical body 32 and on the other hand to an interchangeable connection 38 on which is mounted either a square rod 39 or, directly, the upper element of the circulation column 10. The cylindrical body 32, the annular shoulder 28 and one part of the tube 37 form an annular chamber 40 connected to the outside by means of one or more apertures 41 made in the rotary body 32.

The sealed input screen 8 in the injection head 7 is constituted by: a sliding beater head comprising on the one hand an axially movable tube 42 traversing in a sealed manner a sealing packing 43 fixed to a removable cover 44 of the distributing box 23, and extending over a large part within the injection head 7, and on the other hand a wedge box 45 mounted on the upper end of the sliding tube 42 and constituted by a cylindrical socket 46 presenting a truncated bore 47 in which are provided at least two truncated bodies 48 surrounding in a sealed manner the cable 9, adjusting members 49a and 49b being fixed on the cylindrical socket 46 and acting on the wedges 48 so as to urge them against the cable 9. A threaded adjusting socket 49 screwed in the upper part of a perforated support pot 50 for the sealing packing 43 permits the pressure of the packing 43 on the sliding tube 42 to be regulated, this support pot 50 being integral with the removable cover 44. The sealing packing 43 is advantageously constituted by a stack of several sectioned rings 51 made of a semi-supple material and forming a labyrinth joint.

The device for tightening the cable 9 by the wedges 48, arranged so as to ensure the seal between the wedge box 45 and the cable 9, will have to oppose only reduced strains determined in the first place by the pressure of the mud. The pressure of the circulating mud exerted on the sliding beater head 8 tends to lift it, and consequently the cable 9, upwardly, so that the latter is held in a stretched position. The weight of the cable 9 and the pressure of the mud increase with the depth of the drill hole 22, the effect of tension on the cable 9 will tend to be maintained constant. Of course, the length of the sliding tube 42 is suitably chosen as a function of the maximum course envisaged for the trepan 13.

As may be seen in particular in FIGURES 6 to 8, the percussion equipment comprises the trepan 13, the master rod 14, and if necessary the intermediate rod 15, the additional-thrust springs 16 and the suspension head 17.

The springs 16 are preferably of even number, for example two. In the present case, the two springs 16 surround the intermediate rod 15 and are supported on the one hand on a base 52 integral with the master rod 14 and on the other hand the annular stop 19 fixed to an element of the circulation column 10, and preferably at the junction point of two adjacent elements of the column 10, by means of sleeves 53 which permit the simple mounting and dismounting of said column. The location of this stop 19 is selected so that the distance between the end of the trepan 13 and the suspension head 17 is greater than the distance between the bottom 21 of the drill hole 22 and the annular stop 19. Thus, in normal position of the circulation column 10, the trepan 13 can always effect its maximum descending course without the suspension head 17 coming into contact with the stop 19.

Between the two springs 16 there is provided an annular disc 54 having two bearing surfaces, one on each side thereof, and which disc is perforated like the base 52, in order to permit the free circulation of the cleaning fluid, this disc 54 is able to slide freely on the rod 15. It is advantageous to use two identical cylindrical springs, but with reverse pitch in order to annul the torsional stresses. The master rod 14 is guided axially and in a substantially sealed manner by a guiding sheath 55 integral with the lower element 56 of the circulation column 10. The annular space between the master rod 14 and the guide sheath 55 is small so that it can be considered that, despite wear and tear, the losses of mud therein are negligible, with respect to the total outflow of the cleaning fluid.

The means 20 for communicating the internal space of the circulation column 10 with the space situated above the base 21 of the drill hole 22, according to a preferred embodiment, are constituted by two channels 57, 58 integral with the last element 56 of the circulation column 10 and opening out at the lower end of this latter into the space situated above the bottom 21 of the drill hole 22.

The circulation channels 57, 58 advantageously serve for the axial guiding of the trepan 13.

In the case of a flat trepan (FIGURES 6 to 11), the latter may be guided on its parallel faces by the internal walls of the circulation channels 57, 58, these walls merging moreover in part with the wall of the guide sheath 55.

At the spot where the circulation channels 57, 58 open out into the internal volume of the circulation column 10, the space formed by a part of the internal wall of the circulation column 10, and the external walls of the circulation channels 57, 58, and of the guide sheath 55, is closed by a closing plate 59, of suitable shape soldered in a sealed manner on the corresponding element of the circulation column 10. Thus, the cleaning fluid injected into the column 10 is obliged to pass exclusively through the circulation channels 57, 58.

The shape and method of fixing the base 52 are more particularly shown in FIGURES 12 and 13. This base 52 is constituted by two concentric rings 60, 61 the internal ring 60 rests on a shoulder of the upper end of the master rod 14 and is connected to the external ring 61 by means of a few spacers 62 forming with the two rings passages 63 for the cleaning fluid. The spring 16 rests on the external ring 61 and urges the base 52 against the shoulder of the master rod 14.

The suspension head 17 is mounted on the intermediate rod 15. It may for certain applications be fixed directly to the master rod 14. This embodiment will now be described in greater detail.

The suspension head 17 comprises: a guide socket 64 for the tip 18 of the cable 9; two lateral stops 65 integral with the socket 64 and intended for collaborating with the perforated annular stop 19 of the circulation column 10; and two locking hooks 66 articulated one opposite the other on the socket 64 perforated at the location of the hooks 66 capable of locking the lower tip 18 of the cable 9 in the suspension head 17 or of unlocking it under the action of the annular stop 19.

Each locking hook 66 is mounted between two walls of the lateral stop 65 and is integral with an articulation axis 67 which is movable perpendicularly to the axis of the cable 9 and lodged in rectangular openings 68 of the walls of each corresponding lateral stop 65, and comprises: an internal truncated face 69, the lower end of which cooperates with the tip 18 of the cable 9; an upper cavity 70 which is upwardly opened and substantially in the shape of a rounded V in which is engaged the rounded lower end of a support plate 71 integral with the socket 64, this lower end or rounded edge constituting a fixed axis about which the hook 66 oscillates, and a downwardly opened lower cavity 72, substantially in the shape of a rounded V, in whose base is fixed the articulation axis 67.

Each hook 66 thus comprises two lateral cavities 70, 72 formed by four branches approximately forming an X, whose internal and lower branch 73 serves as a stop for the shoulder 74 of the tip of the cable 18, and whose upper internal branch 75 constitutes a stop for the socket 64, the upper external branch 76 of which serves as a stop for the hook 66 at the end of its travel, and the lower external branch 77 of which is intended to control, in collaboration with the perforated annular stop 19, the swinging of the hook 66 so as to bring it into the unlocked position in which the suspension head rests on the annular top 19 (FIGURE 5) and the tip of the cable 18 is released.

The bulk of the hook 66 and its articulation axis 67 is arranged so that its internal lower branch 73 is urged under the effect of the weight of the hook towards the center of the socket 64 (FIGURES 3 and 4). This movement is further enhanced by the base, which is downwardly inclined towards the axis of the suspension head 17, of the oblong openings 68.

It must be further noted that the movable articulation axis 67 of the hook 66 undergoes no stress. It acts to localize the position of the hook 66 by limiting the displacements of the latter to the necessities of its function. at the base of the socket 64 there are provided a few lateral apertures 64a for avoiding an excess pressure of the boring fluids during the introduction of the tip 18 into the socket 64.

According to another embodiment (FIGURE 14) the means 20 for communicating the internal space of the suspension column 10 with the space situated above the bottom 21 of the drill hole 22 is constituted by a single channel 78 made axially in the master rod 14 and in the trepan 13 which for example is a trepan having four flanges. The lower end of the circulation column 10 serves to guide the master rod whose upper end 14 is connected by means of spacers 79 to a connection 80 integral with the intermediate rod 15.

The springs 16 and the suspension head 17 are arranged in the same manner as that described previously.

For a reverse circulation of the cleaning fluid, it is advantageous to use the embodiment shown in FIGURE 15. The lower element 56 of the circulation column 10 has the form of an elongated bell, inside which is fixed the guide sheath 55 of the master rod 14 integral with the suspension head 17, by means of a short intermediate rod 15 or a narrow part of the master rod 14, two circulation channels in the shape of tubes 81, 82 being connected to this bell and serving to guide the trepan 13 which surrounds them and serves as a support for the additional-thrust spring 16 mounted around these channels 81 and 82 and resting at their upper end on an external stop 83 fixed to the bell 56. The guide sheath 55 is surmounted by a protective tube 84 intended to form with one part of the bell 56 an annular bell 85 in which the two channels 81 and 82 open out, and in which the cleaning fluid remounts. In addition, this tube 84 serves to protect the master rod 14, the rod 15 and the head 17 against erosion by the excavated materials transported by the cleaning fluid to the inside of the annular space 85. At the base of the tube 84 there are provided lateral apertures 86 which have for an object to reduce the difference in pressures prevailing on the one hand inside the tube 84 and on the other hand in the annular space 85. In addition, these apertures permit the sedimentation of the excavated products on the base on the tube 84 to be avoided or at least limited, this tube comprising near its lower end the perforated annular stop 19 intended to cooperate with the suspension head. The elements having in FIGURE 15 the same references as those shown in the preceding figures, are either identical or similar to those described above during the discussion of the different figures.

This latter embodiment is suitable in particular for the reverse circulation of the cleaning fluid, i.e. for the descent of the cleaning fluid into the annular space between the walls of the bore hole and of the circulation column and the remounting of the fluid charged with excavated materials in said column. In this case, it is advantageous to use a constant level pumping device.

Of course, by cleaning fluid one understands not only the difference sorts of mud but also air and the fluids of a liquid-solid-gas mixture.

The method of operation of the apparatus according to the invention is the following:

It is assumed that the equipment is in the position such as that shown in FIGURE 8, i.e. in a position where the trepan 13, the master rod 14, the intermediate rod 15 and the suspension head 17 are hooked to the stop 19 of the circulation column 10 which for its part is suspended from the maneuvering platform 11 or on the pulley block 4. The oscillating hook 66 is located in unlocking position (FIGURE 5). The tip 18 of the cable 9 is outside the suspension head 17. When the column 10 is descended, the trepan 13 is the first to come into contact with the bottom 21 of the hole 22, so that the suspension head 17 leaves the annular stop 19 and the hooks 66 oscillate by their own weight in the locking position. The tip 18 which for its introduction into the socket can separate the hooks 66 will be confirmed by these latter during the raising of the cable 9. This position of the hooks 66 is similar to that shown in FIGURES 3 and 4. Thus, the cable 9 has become integral with the trepan 13 and the beating operations may be carried out.

Of course, the wedge box 45 is previously closed, because for the descent of the cable 9, the wedges 48 have had to be losened. It is then that the cleaning fluid can begin to be injected.

In the course of the beating operations, the hooks 66 tend to grip round the tip 18, whose release will be able to be obtained only by the raising of the column 10 until the trepan 13 is again suspended therefrom.

This suspension column 10 is generally lowered as far as a location where the springs 16 are already undergoing an initial charge before any displacement of the spring. This initial preconstraint of the springs 16 is regulated as a function of the striking force envisaged. During the beating action, the lower end of the column 10 is located at a rather small distance from the bottom of the hole 21, this distance being maintained constant by lowering the column 10 in proportion to the progression of the boring. The cleaning fluid leaving the vents of the channels 57, 58 contacts the bottom of the hole 21 and evacuates the continuously excavated products.

Of course, the previously described embodiments have been given only by way of non-limiting examples. The essential point of the invention consists in an apparatus for boring by cable controlled percussion permitting a continuous circulation of the cleaning fluid and the simple maneuver of the boring movement without the presence of the cable being a hindrance. Numerous modifications may be given to the previously described object without departing from the scope of the invention.

What I claim is:

1. Apparatus for drilling by cable-controlled percussion and comprising: a derrick; a cable; a beater motor for maneuvering the cable and a trepan provided with a master rod connected to the cable; a circulation column provided at its lower end with a guide member for the trepan and/or the master rod and at its upper end with an injection head suspended on a yoke guided by the derrick and maneuvered by a pulley block mounted on said derrick; a sealed input screen for the cable in the injection head; said screen being axially movable with respect to the injection head and capable of surrounding in a sealed manner said cable; means for communicating the circulation column with a space situated in front of a cutting edge of the trepan when said trepan is in a hole to be bored; and a suspension head integral with the trepan and intended to hook the trepan and its master rod alternately either to the lower tip of the cable or to the circulation column.

2. Apparatus according to claim 1, wherein the sealed input screen in the injection head is constituted by a sliding beater head comprising on the one hand an axially movable tube, traversing in a sealed manner a sealing packing fixed to a removable cover of a distributing box and extending over a large part of the inside of the injection head, and on the other hand a wedge box mounted on the upper end of the sliding tube and constituted by a cylindrical socket presenting a truncated bore in which are provided at least two truncated wedges surrounding the cable in a sealed manner, adjusting members being fixed on the cylindrical socket and acting on the wedges so as to urge them against the cable.

3. Apparatus according to claim 1, wherein the percussion equipment comprises the trepan, the master rod and if necessary, an intermediate rod, additional-thrust springs and the suspension head, the springs preferably being of an even number, surrounding the intermediate rod and being supported on the one hand on a base integral with the master rod and on the other hand on an annular stop fixed on an element of the circulation column and preferably at the junction point of two adjacent elements of the column.

4. Apparatus according to claim 1, wherein the master rod is axially guided in a substantially sealed manner by a guide sheath integral with the lower end of the circulation column, an annular space formed between the master rod and the guide sheath being very small.

5. Apparatus according to claim 1, wherein the means for placing the circulation column in communication with the space situated in front of the cutting edge of the trepan is constituted by two integral channels formed in the lower end of the circulation column and opening out at the lower end of the circulation column into the space situated in front of the cutting edge of the trepan.

6. Apparatus according to claim 1 further including circulation channels which serve to axially guide the trepan.

7. Apparatus according to claim 1, including circulation channels, wherein at the spot where the circulation channels open out into the internal volume of the circulation column, the space delimited by one part of the internal wall of the circulation column and the external walls of the circulation channels and of a guide sheath is closed by a closing plate of suitable shape sealed to the corresponding element of the circulation column.

8. Apparatus according to claim 1 further including means for placing the circulation column in fluid communication with the space situated in front of the cutting edge of the trepan, which means comprises a single channel made axially in the master rod and in the trepan which, for example, is a trepan having four flanges; the upper end of the circulation column is connected by means of spacers to a connection integral with an intermediate rod.

9. Apparatus according to claim 1 wherein the lower end of the circulation column has the form of an elongated bell inside which is fixed a guide sheath for the master rod connected by means of a short intermediate rod with the suspension head; two tubular circulation channels connected to this bell and serving to guide the trepan which surrounds them and serves as a support for additional springs mounted about these channels and supported at their upper end by an external stop fixed to the bell.

10. Apparatus according to claim 1, wherein the suspended head comprises a guide socket for the tip of the cable, two lateral stops integral with the socket to collaborate with a perforated annular stop of the circulation column and two locking hooks articulated one opposite the other on the socket perforated at the location of the hooks capable of locking the lower tip of the cable in the suspension head or of unlocking it under the action of the annular stop.

11. Apparatus according to claim 10, wherein each locking hook is mounted between two walls of a lateral stop and is integral with an axis of articulation which is movable perpendicularly to the axis of the cable and lodged in rectangular openings in the walls of each lateral stop, and comprises an internal truncated face, whose lower end cooperates with the tip of the cable, an upwardly opened upper cavity, substantially in the form of a rounded V, in which is engaged the rounded lower end of a support plate integral with the socket, this lower end or rounded edge constituting a fixed axis about which the hook oscillates and a downwardly opened lower cavity, substantially in the form of a rounded V in whose base is fixed the axis of articulation.

12. Apparatus according to claim 10, wherein each hook comprises two lateral cavities formed by upper and lower internal and external branches approximately forming an X, the internal lower branch of which serves as a stop for a shoulder formed on the tip of the cable, the upper internal branch of which constitutes a stop for the socket, the upper external branch of which serves as a stop for the hook at the end of its travel, and the lower external branch of which is intended to control, in cooperation with the perforated annular stop, the swinging of the hook, so as to bring it into the unlocked position in which the suspension head rests on the annular stop and the tip of the cable is released.

13. Apparatus according to claim 12, wherein the bulk of the hook and its axis of articulation is arranged so that its internal lower branch is urged under the effect of the weight of the hook towards the centre of the socket.

14. Apparatus for drilling by cable-controlled percussion comprising: a cable, a trepan and a pipe string for driving the trepan; said pipe string being employed as a mud pipe provided at its lower end with an axial guide member for the trepan and comprising: a suspension head detachably mounted on the cable and rigidly connected to the trepan; a guide member for the trepan fixed on the lower end of the pipe string, which has integrally formed therein mud channels and which drives the trepan.

15. Apparatus according to claim 14 wherein the lower end of the pipe string has the form of an elongated bell inside which is fixed the guide member for the pipe string through the intermediary of a short rod attached to the suspension head and two mud channels serving to guide the trepan.

16. Apparatus according to claim 14 comprising an annular stop for the suspension head, fixed on the lower end of the pipe string and surrounding the suspension head, said stop further comprising holes for the passage of mud.

17. Apparatus according to claim 16 wherein the suspension head comprises a socket for holding the tip of the cable; two lateral stops fixed on the socket and a stop for the suspension head comprising two hooks articulately mounted one opposite the other on the socket in cavities provided in the socket; said hooks capable of locking the tip of the cable in the suspension head or of unlocking it when they cooperate with the annular stop.

18. Apparatus according to claim 17 wherein each hook is mounted between two walls formed in the socket, and is fixed on a pin which is perpendicular to the axis of the cable; each pin is lodged in an oval shaped hole formed in the walls of each corresponding lateral stop; each lateral stop comprising an upwardly opened upper cavity in the form of a rounded V, in which is engaged the rounded lower end of a support plate integral with the socket, and a downwardly opened lower cavity in the form of a rounded V in which is fixed the pin; said lower end of each support plate constituting a fixed axis about which the corresponding hook oscillates.

19. Apparatus according to claim 18 wherein each hook comprises two cavities formed laterally by upper and lower internal and external branches approximately forming an X, the internal and lower branch of which serves as a stop for a shoulder of the tip of the cable, the upper branch of which constitutes a stop for the socket, the upper external branch of which limits the movement of the hook and the lower external branch of which in cooperation with the annular stop, operates the hook, so as to bring it into the unlocking position in which the suspension head rests on the annular stop and the tip of the cable is released.

20. Apparatus for drilling by cable-controlled percussion and comprising: a trepan; a cable; a string of rods; a distribution head connected by an intermediate tube to a mud pump; said distribution head having at its lower end a pipe and carrying at its upper end a sealed input screen through which the cable, connected with the trepan, is introduced in a sealed manner to the interior of the string of rods; and a suspension head at the upper end of the string of rods fixed at least in the axial direction and comprising a locking chamber hermetically surrounding one part of the cable which is axially movably carried in a sealed manner in the suspension head.

21. Apparatus according to claim 20 comprising a roller bearing for the rotatably movable suspension of the string of rods.

References Cited
UNITED STATES PATENTS

| | | | |
|---|---|---|---|
| 631,423 | 8/1899 | Fauck | 175—189 |
| 1,934,329 | 11/1933 | Ruhl | 175—189 |
| 2,815,934 | 11/1957 | Collins | 175—189 |

CHARLES E. O'CONNELL, *Primary Examiner.*

R. E. FAVREAU, *Assistant Examiner.*

U.S. Cl. X.R.

175—213